United States Patent [19]

Alewelt et al.

[11] Patent Number: 5,247,063

[45] Date of Patent: Sep. 21, 1993

[54] PROCESS FOR THE PURIFICATION OF POLYARYLENE SULPHIDES

[75] Inventors: Wolfgang Alewelt; Franz Alfes, both of Krefeld; Wolfgang Eisermann, Duesseldorf; Erhard Tresper, Krefeld, all of Fed. Rep. of Germany

[73] Assignee: Bayer Aktiengesellschaft, Leverkusen-Bayerwerk, Fed. Rep. of Germany

[21] Appl. No.: 898,172

[22] Filed: Jun. 12, 1992

Related U.S. Application Data

[63] Continuation of Ser. No. 406,188, Sep. 13, 1989, abandoned, which is a continuation of Ser. No. 181,118, Apr. 13, 1988, abandoned.

[30] Foreign Application Priority Data

Apr. 24, 1987 [DE] Fed. Rep. of Germany ....... 3713669

[51] Int. Cl.$^5$ ............................................. C08G 75/14
[52] U.S. Cl. ................................... 528/388; 528/502; 525/537
[58] Field of Search ................. 528/388, 502; 525/537

[56] References Cited

U.S. PATENT DOCUMENTS

| | | |
|---|---|---|
| 4,071,509 | 7/1978 | Edmonds . |
| 4,373,091 | 3/1983 | Edmonds . |
| 4,522,875 | 6/1985 | Still, Jr. et al. ...................... 428/419 |
| 4,576,852 | 3/1986 | Burgess et al. ...................... 428/340 |
| 4,617,231 | 10/1986 | Hamada et al. ...................... 428/903 |
| 4,639,507 | 1/1987 | Alewelt et al. ...................... 528/502 |
| 4,734,484 | 3/1988 | Alfes et al. ........................... 528/502 |
| 4,771,120 | 9/1988 | Alewelt et al. ...................... 528/388 |

Primary Examiner—John C. Bleutge
Assistant Examiner—Helen F. Lee
Attorney, Agent, or Firm—Connolly & Hutz

[57] ABSTRACT

This invention relates to a process for the purification of optionally branched polyarylene sulphides (PPS). Polyarylene sulphides which have been purified according to the invention are distinguished by the reduced amount of ash-forming impurities contained in them.

1 Claim, No Drawings

PROCESS FOR THE PURIFICATION OF POLYARYLENE SULPHIDES

This application is a continuation of application Ser. No. 07/406,188 filed on Sep. 13, 1989, now abandoned which is a continuation of application Ser. No. 181,118, filed Apr. 13, 1988, now abandoned.

This invention relates to a process for the purification of optionally branched polyarylene sulphides (PPS). Polyarylene sulphides which have been purified according to the invention are distinguished by the reduced amount of ash-forming impurities contained in them.

Polyarylene sulphides and processes for their preparation and isolation are known (e.g. U.S. Pat. No. 4,071,509, JA-P 57 108-135, DE-OS 3 143 992, U.S. Pat. Nos. 3,354,129, 3,457,242, 3,478,000, 3,687,907, 3,707,528, 3,839,302, 3,941,664, 3,956,060, 4,046,749 and 4,178,435 and EP 79 144).

It is known, for example, that the solvent in which the polymerisation of the halogenated aromatic compounds and the source of sulphur was carried out may be evaporated from the reaction mixture and the inorganic salts may then be washed out of the remaining residue. Alternatively, the reaction mixture obtained after the polymerisation reaction may be immediately introduced into water without removal of the solvent and the precipitated residue may then be separated and washed. It is also known to wash the residue with organic solvents such as acetone, aromatic hydrocarbons, dimethylsulphoxide (DMSO) and N-methylpyrrolidone (NMP).

Polyarylene sulphides may also be purified by, for example, heating them in water with alkali metal acetates to temperatures just below their melting point (DE-OS 3 143 992), or by extraction with solvent mixtures such as N-methylpyrrolidone and ethylene glycol (JA-P 57 108-135) or by heating them in organic amides in the presence of certain alkali metal salts (U.S. Pat. No. 4,071,509), etc.

The amount of ash-forming impurities in PPS may also be reduced by treatment of the aqueus PPS suspensions with atmospheric oxygen at temperatures above 200° C. but this may be accompanied by uncontrolled branching or cross-linking of the product (U.S. Pat. No. 4,376,190).

Purified PPS has a lower concentration of ash-forming impurities and splits off a smaller amount of volatile compounds when processed and therefore causes less corrosion to the tools and apparatus used for its processes. Furthermore, impurities left in PPS are liable to be troublesome when polyarylene sulphides are used for electrical parts.

It has been found that the amount of ash-forming impurities contained in PPS can be considerably reduced if moist polyarylene sulphides obtained, for example, after they have been washed to extract the soluble impurities in the process for their preparation, are demoisturised under a high pressure while subjected to shearing forces, e.g. in suitable pressure belts or between pressure rollers.

The present invention relates to a process for the purification of polyarylene sulphides with reduction of the quantity of ash-forming impurities, characterised in that moist polyarylene sulphides are demoisturised under a high pressure with concomitant application of shearing forces.

The process according to the invention may be used for treating, for example, straight chained or branched polyarylene sulphides which have been prepared by, for example, the known reaction of a) 50 to 100 mol-% of dihalogenated aromatic compounds of the formula

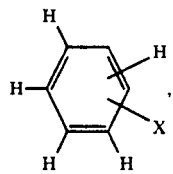
(I)

and 0 to 50 mol-% of dihalogenated aromatic compounds of the formula

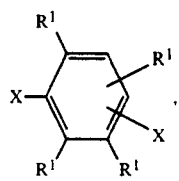
(II)

wherein

X stands for halogens such as chlorine or bromine in the meta- or para-position to one another and R¹ stands for identical or different groups and may denote hydrogen, alkyl, cycloalkyl, aryl, alkylaryl or arylalkyl or two groups R¹ in the ortho-position to one another may be linked together to form an aromatic or heterocyclic ring, and b) 0 to 5 mol-%, preferably 0.05 to 2.5 mol-%, based on the sum of the dihalogenated aromatic compounds of formulae (I) and (II), of a tri- or tetra-halogenated aromatic compound of the formula $$ArX_n \qquad (III)$$

wherein

Ar denotes an aromatic or heterocyclic group,

X stands for a halogen such as chlorine or bromine and n stands for the number 3 or 4, and c) alkali metal sulphides, preferably sodium or potassium sulphide or mixtures thereof, preferably in the form of their hydrates or aqueous mixtures, optionally together with alkali metal hydroxides such as sodium or potassum hydroxide, the molar ratio of (a+b):c being in the range of from 0.85:1 to 1.15:1, preferably from 0.90:1 to 1.05:,in d) organic solvents, preferably N-alkyl-lactams or peralkylated ureas, optionally with the addition of catalysts and/or cosolvents, using a molar ratio of alkali metal sulphides c) to organic solvents d) in the range of from 1:2 to 1:15, and e) water in the form of water of hydration or free water, the molar ratio of c:d being in the range of from 1:0 to 1:6, at a reaction temperature of from 160° C. to 270° C., optionally under excess pressure.

The reaction mixture obtained may be introduced into a precipitating agent after the polymerisation reaction. The soluble impurities may be washed out of the precipitated polyarylene sulphide with water and/or some other extracting agent.

PPS obtained by the method described above may be in the form of a course or fine powder or in the form of fibres or platelets. It may be converted into another form before further processing if this appears to be advantageous, and it is moist (with solvent/water).

Polyphenylene sulphides obtained by no matter what method of preparation, e.g. ordinary commercial polyphenylene sulphides, may also be freed from ash-forming residues by the process according to the invention after they have been suitably worked up. The moist polyarylene sulphides obtained, which have optionally been filtered or extracted, e.g. by pressure or suction filters, have a solids content of from 15 to 35%.

According to the invention, the polyarylene sulphides are subjected to a further mechanical demoisturising process which increases their solids content to 40–95%, preferably 50–95%. In the process according to the invention, the proportion of ash-forming impurities does not only decrease in proportion to the quantity of liquid removed, as is normally the case when filters or centrifuges are employed, but decreases to a much greater extent.

In the process according to the invention, the moist PPS with a solids content of 15 to 35% obtained after a preliminary filtration conventionally carried out in the known processes of preparation is dosed continuously or discontinuously into suitable, known apparatus which are capable of applying a high pressure of from 5 to 400 bar on the product and at the same time subjecting it to shearing.

According to the invention, the apparatus used for this purpose may be, for example, pressure belts or high pressure rollers. According to the particular apparatus employed, it is advantageous to take into account not only the pressure but also, for example, the linear pressure in the case of pressure belts, the absorption of force in the case of high pressure rollers, the velocity profiles in the case of pressure rollers arranged in pairs and the surface characteristics of rollers or belts. The shearing forces may be introduced by known measures, for example by rotating the rollers of a pair at different velocities or by squeezing the product between a pair of rollers which differ from one another in their surface characteristics.

EXAMPLES

Preparation of a polyphenylene sulphide by a known method (e.g. DE-OS 3 428 984).

1110 g of N-methylcaprolactam, 325.5 g of sodium sulphide hydrate (=2.45 mol Na$_2$S), 2.4 g of 50% sodium hydroxide solution, 341.1 g of 1.4-dichlorobenzene (=2.32 mol), 28.53 g of sodium acetate and 5.07 g of ε-aminocaproic acid (0.035 mol) are introduced under nitrogen into a 2 l three-necked flask equipped with a thermometer, a stirrer and a column with distillate divider. The reaction mixture is slowly heated to boiling. Water is separated from the azeotropic mixture of water and p-dichlorobenzene distilling off and the p-dichlorobenzene is returned to the reaction vessel. No more water can be detected either in the distillate or in the sump after 2 hours. Heating is continued under reflux for a further 9 hours.

The reaction mixture is then introduced into 1 l of isopropanol with vigorous stirring. The precipitated product is washed four times with four times its quantity of precipitating agent and then washed free from electrolyte with water to remove residues of inorganic salts (conductivity of wash water below 10 μS corresponding to a sodium chloride content of less than 5 ppm).

Example 1

Drying at elevated temperature in a vacuum as comparison example

A polyarylene sulphide having a solids content of 18% and obtained, for example, by the method described above, is dried in a drying cupboard under a vacuum of 10 mbar at 140° C. for 12 hours. The quantity of ash-forming impurities is then determined (see Table).

Example 2

Separation of PPS by centrifuging as comparison example

A polyphenylene sulphide as described in Example 1 is introduced into a centrifuge and centrifuged for 5 minutes during which it is subjected to a pressure of about 20 bar. The results are shown in the Table.

Example 3

Drying on rollers as comparison example

Example 2 is repeated but a pressure belt is used instead of the centrifuge. An increasing pressure finally reaching approximately 80 bar is applied to the product between three pairs of rollers while the two belts both move at the same velocity. The results are shown in the Table.

Example 4

Drying on high pressure rollers as comparison example

Example 2 is repeated but a pair of high pressure rollers is used instead of the centrifuges, and a pressure of about 200 bar is applied to the product. The surfaces of the rollers are smooth. Examples according to the invention:

Example 5

Example 3 is repeated with the velocities of the belts differing by 5%.

Example 6

Example 4 is repeated but the surfaces of the rollers are covered with 5×5 m squares 2 mm in depth to produce shearing The quantity of ash-forming impurities is determined by burning the product in a muffle furnace at 1000° C. in the presence of atmospheric oxygen. The residue of this combustion is described as the ash-forming residue.

TABLE

| Example | Solids content after mechanical dewatering (%) | Content in ash forming impurities (% based on PPS) |
|---|---|---|
| 1 (Comparison) | 18 | 0.75 |
| 2 (Comparison) | 55 | 0.21 |
| 3 (Comparison) | 63 | 0.16 |
| 4 (Comparison) | 90 | 0.11 |
| 5 according to the invention | 65 | 0.03 |
| 6 according to the | 90 | 0.01 |

TABLE-continued

| Example | Solids content after mechanical dewatering (%) | Content in ash forming impurities (% based on PPS) |
|---|---|---|
| invention | | |

We claim:

1. A process for preparing purified polyarylene sulfides with removal of ash-forming impurities, comprising:
   a) preparing a polyarylene sulfide reaction mixture by the reaction of dihalogenated aromatic compounds, tri- or tetra-halogenated aromatic compounds, and alkali metal sulfides in the presence of an organic solvent and water;
   b) filtering or extracting the reaction mixture to a solids content of 15% to 35%; and
   c) demoisturizing the reaction mixture under pressure of 5 to 400 bar with simultaneous application of shearing forces by means of belts or rollers to a solids content of 40 to 95%.

* * * * *